United States Patent [19]

Micheletti

[11] Patent Number: 5,269,249
[45] Date of Patent: Dec. 14, 1993

[54] HIGH-SPEED HYDROHULL

[76] Inventor: Pietro Micheletti, Via San Pantaleone, 55058 S. Maria del Giudice, Lucca, Italy

[21] Appl. No.: 895,577

[22] Filed: Jun. 8, 1992

Related U.S. Application Data

[63] Continuation of Ser. No. 671,013, Mar. 18, 1991, abandoned.

[51] Int. Cl.$^5$ ............................................. B63B 1/16
[52] U.S. Cl. ........................................ 114/272; 114/61; 114/67 A
[58] Field of Search .......................... 114/271–273, 114/251, 61, 67 A

[56] References Cited

U.S. PATENT DOCUMENTS

| | | | |
|---|---|---|---|
| 1,901,357 | 3/1933 | Raulerson et al. | 114/273 |
| 2,272,661 | 2/1942 | Finley | 114/272 |
| 2,354,569 | 7/1944 | Beard | 114/291 |
| 2,521,268 | 9/1950 | Troeng | 114/271 |
| 2,564,587 | 8/1951 | Sundstedt | 114/291 |
| 3,661,111 | 5/1972 | Lippisch | 114/67 A |
| 3,804,049 | 4/1974 | Greer | 114/273 |
| 3,918,382 | 11/1975 | Austin | 114/273 |
| 4,365,578 | 12/1982 | Schellhaas | 114/272 |

FOREIGN PATENT DOCUMENTS

| | | | |
|---|---|---|---|
| 565579 | 12/1932 | Fed. Rep. of Germany | 114/273 |
| 667603 | 3/1951 | Netherlands | 114/272 |

*Primary Examiner*—Jesûs D. Sotelo
*Attorney, Agent, or Firm*—McGlew & Tuttle

[57] ABSTRACT

The high-speed hydrohull comprises a portion (1) having, in a longitudinal section, an airfoil profile with a low coefficient of aerodynamic resistance, having a convex upper surface (1B) in order to create, during the movement of the hydrohull, such lift as to raise the hydrohull over the surface of the water.

11 Claims, 7 Drawing Sheets

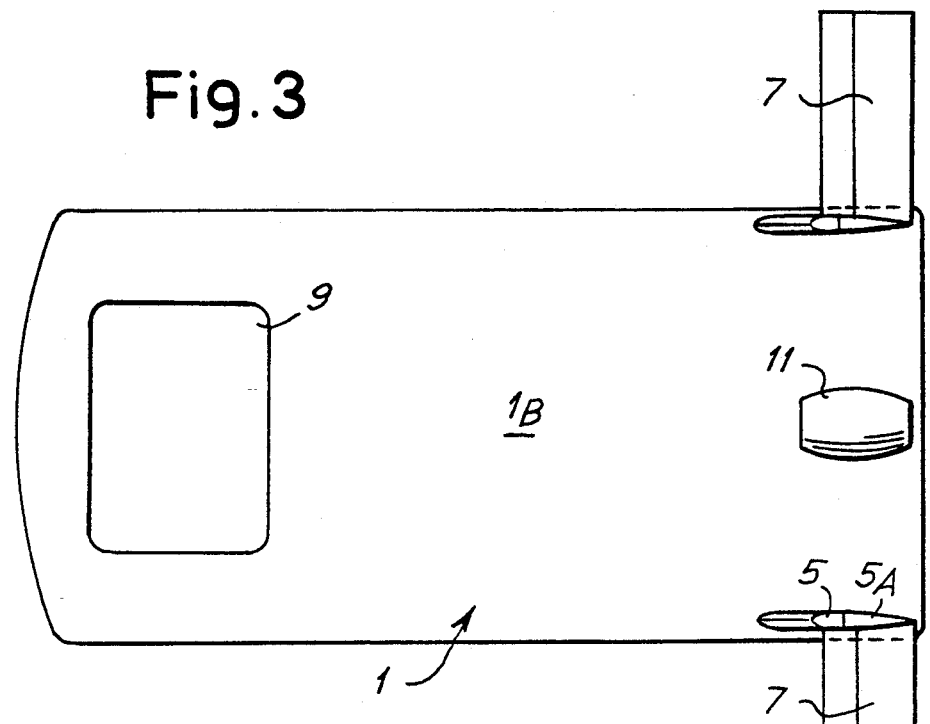
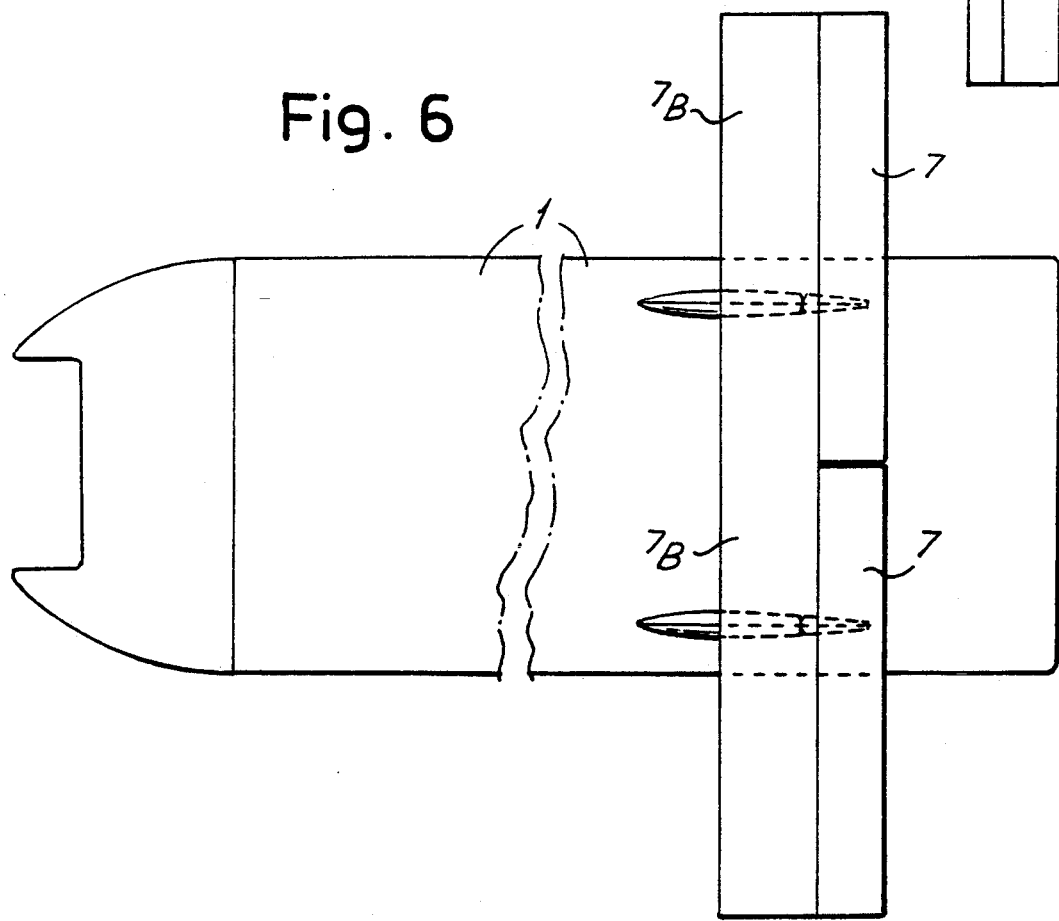

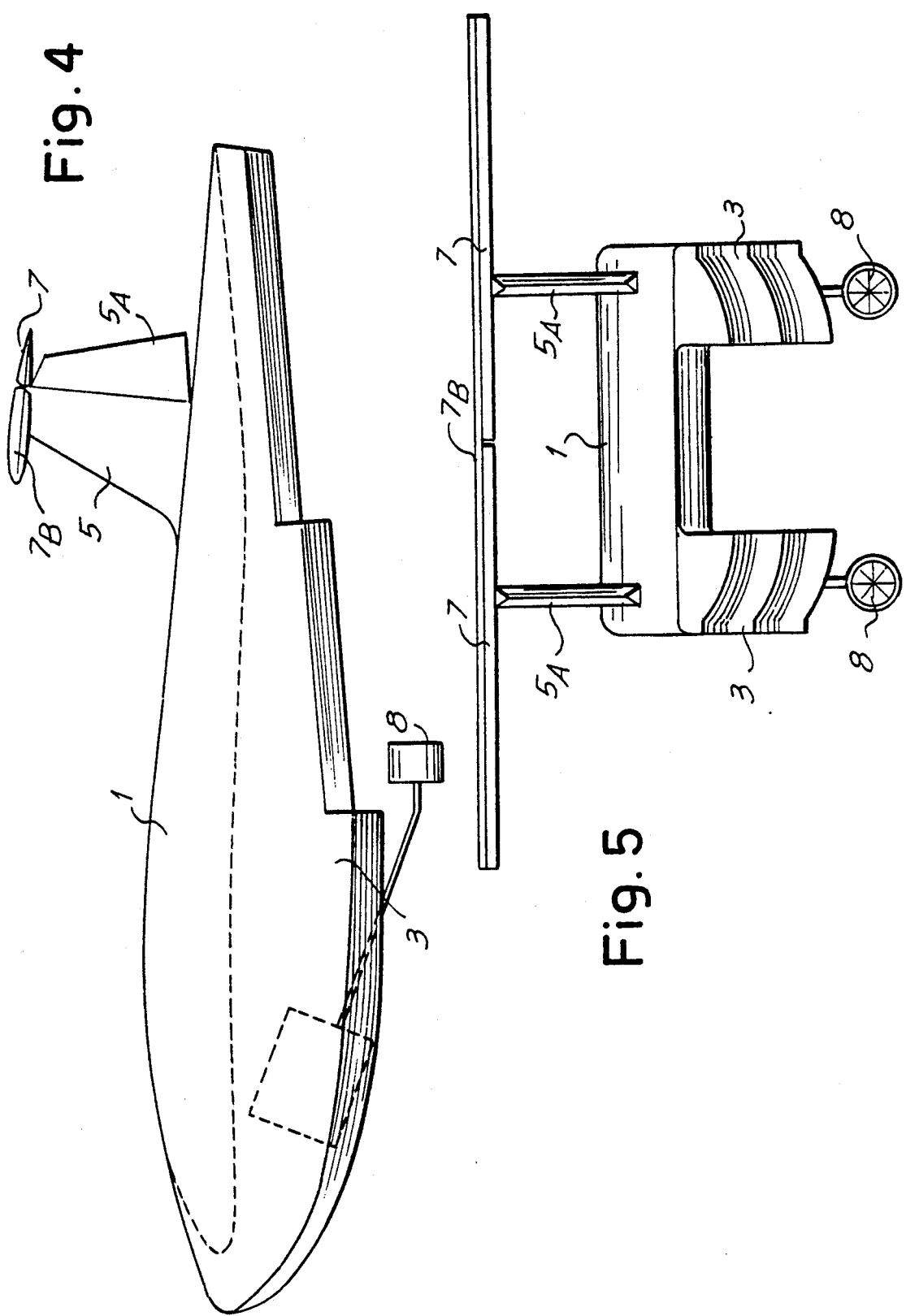

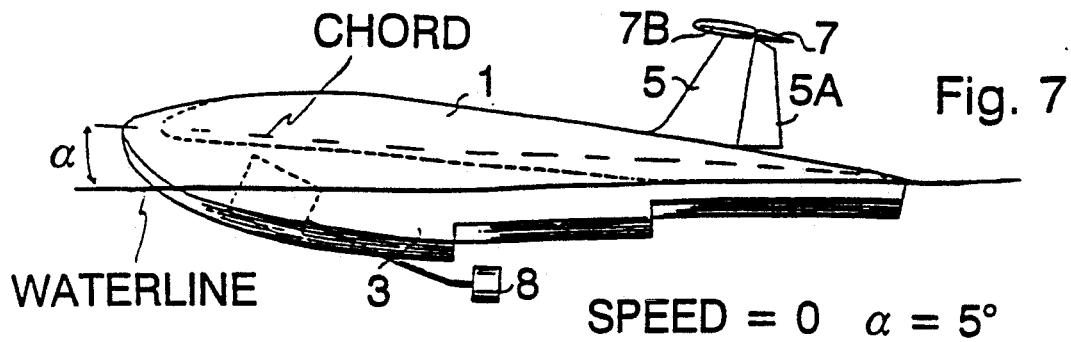
Fig. 7 SPEED = 0  α = 5°
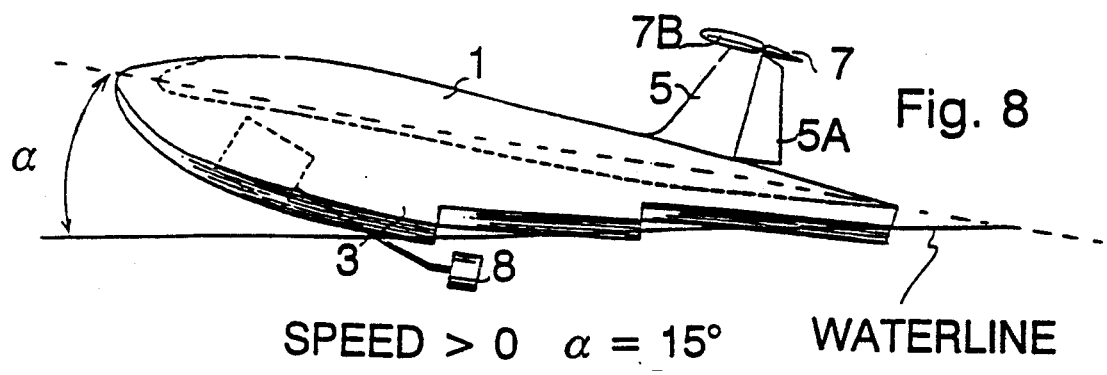
Fig. 8 SPEED > 0  α = 15°
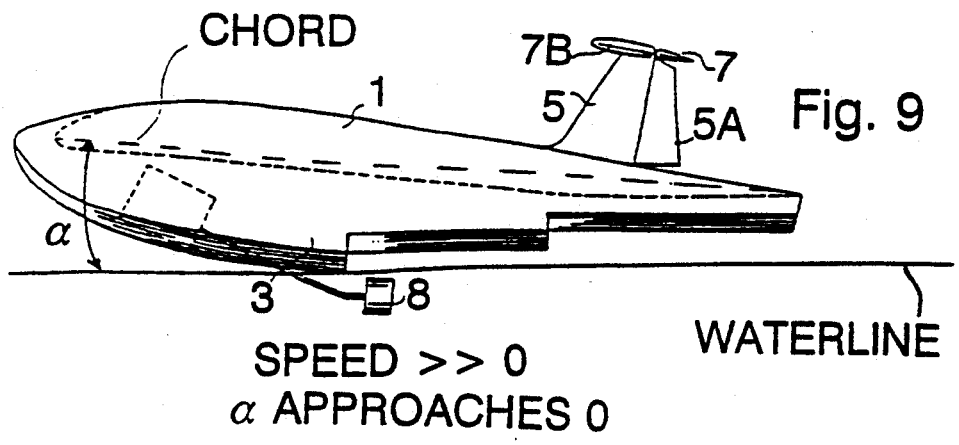
Fig. 9 SPEED >> 0  α APPROACHES 0

Cp = .238   S = .5964   WEIGHT = 9.5Kg

| Km/h | m/s | LIFT | APPARENT WEIGHT |
|---|---|---|---|
| 36 | 10 | .887145 | 8.612855 |
| 43.2 | 12 | 1.277489 | 8.222511 |
| 50.4 | 14 | 1.738804 | 7.761196 |
| 57.6 | 16 | 2.271091 | 7.228909 |
| 64.8 | 18 | 2.87435 | 6.625651 |
| 72 | 20 | 3.54858 | 5.95142 |
| 79.2 | 22 | 4.293782 | 5.206218 |
| 86.39999 | 24 | 5.109956 | 4.390045 |
| 93.6 | 26 | 5.997101 | 3.5029 |
| 100.8 | 28 | 6.955217 | 2.544783 |
| 108 | 30 | 7.984305 | 1.515695 |
| 115.2 | 32 | 9.084365 | .4156351 |
| 122.4 | 34 | 10.2554 | -.7553959 |
| 129.6 | 36 | 11.4974 | -1.997399 |
| 136.8 | 38 | 12.81037 | -3.310374 |
| 144 | 40 | 14.19432 | -4.69432 |
| 151.2 | 42 | 15.64924 | -6.149238 |
| 158.4 | 44 | 17.17513 | -7.675127 |
| 165.6 | 46 | 18.77199 | -9.271988 |
| 172.8 | 48 | 20.43982 | -10.93982 |
| 180 | 50 | 22.17863 | -12.67863 |

TABLE A   $\alpha = 5°$

FIG. 10

Cp = .339    S = .5964    WEIGHT = 9.5Kg

| Km/h | m/s | LIFT | APPARENT WEIGHT |
|---|---|---|---|
| 36 | 10 | 1.263623 | 8.236378 |
| 43.2 | 12 | 1.819616 | 7.680384 |
| 50.4 | 14 | 2.4767 | 7.0233 |
| 57.6 | 16 | 3.234874 | 6.265126 |
| 64.8 | 18 | 4.094137 | 5.405864 |
| 72 | 20 | 5.05449 | 4.44551 |
| 79.2 | 22 | 6.115933 | 3.384067 |
| 86.39999 | 24 | 7.278466 | 2.221535 |
| 93.6 | 26 | 8.542088 | .9579124 |
| 100.8 | 28 | 9.9068 | -.4068003 |
| 108 | 30 | 11.3726 | -1.872603 |
| 115.2 | 32 | 12.93949 | -3.439494 |
| 122.4 | 34 | 14.60748 | -5.107476 |
| 129.6 | 36 | 16.37655 | -6.876547 |
| 136.8 | 38 | 18.24671 | -8.746708 |
| 144 | 40 | 20.21796 | -10.71796 |
| 151.2 | 42 | 22.2903 | -12.7903 |
| 158.4 | 44 | 24.46373 | -14.96373 |
| 165.6 | 46 | 26.73825 | -17.23825 |
| 172.8 | 48 | 29.11386 | -19.61386 |
| 180 | 50 | 31.59056 | -22.09056 |

TABLE B            $\alpha = 10°$

FIG. 11

Cp = .0836    S = .5964    WEIGHT = 9.5Kg

| Km/h | m/s | LIFT | APPARENT WEIGHT |
|---|---|---|---|
| 36 | 10 | .311619 | 9.188381 |
| 43.2 | 12 | .4487314 | 9.051269 |
| 50.4 | 14 | .6107732 | 8.889227 |
| 57.6 | 16 | .7977446 | 8.702255 |
| 64.8 | 18 | 1.009646 | 8.490354 |
| 72 | 20 | 1.246476 | 8.253524 |
| 79.2 | 22 | 1.508236 | 7.991764 |
| 86.39999 | 24 | 1.794926 | 7.705075 |
| 93.6 | 26 | 2.106545 | 7.393456 |
| 100.8 | 28 | 2.443093 | 7.056907 |
| 108 | 30 | 2.804571 | 6.695429 |
| 115.2 | 32 | 3.190979 | 6.309022 |
| 122.4 | 34 | 3.602316 | 5.897684 |
| 129.6 | 36 | 4.038582 | 5.461418 |
| 136.8 | 38 | 4.499779 | 5.000222 |
| 144 | 40 | 4.985904 | 4.514097 |
| 151.2 | 42 | 5.496959 | 4.003041 |
| 158.4 | 44 | 6.032944 | 3.467056 |
| 165.6 | 46 | 6.593858 | 2.906142 |
| 172.8 | 48 | 7.179702 | 2.320298 |
| 180 | 50 | 7.790475 | 1.709525 |

TABLE C          $\alpha = 0°$

FIG. 12

HIGH-SPEED HYDROHULL

This is a continuation of application Ser. No. 07/671,013 filed Mar. 18, 1991, now abandoned.

FIELD AND BACKGROUND OF THE INVENTION

The invention relates to a hydrohull which is particularly suitable for high speeds and enables the craft to be raised so that it is over the water.

It is known that the resistance encountered by a body in motion in a fluid is given by the relation:

$$R = C_f r S V^2$$

where $C_f$ is a coefficient of resistance given by the shape of the body in motion, S is its surface area, V its speed and r the density of the fluid. In a craft, the aerodynamic resistance is negligible compared to the hydrodynamic resistance so long as the craft is moving at a relatively low speed, but as speed increases the craft rises out of the water until it is planing and contact with the water becomes intermittent and occurs over a very small area. The surface area which is instead in contact with the air increases because of the lifting of the craft, so that the aerodynamic resistance rises with the increased contact area and increases at a geometric rate with the increase in speed. The overall resistance to the advance of the craft is given therefore by:

$$R_0 = R_1 + R_2$$

where $R_1$ and $R_2$ are the hydrodynamic and aerodynamic resistances respectively. In crafts according to the state of the art, the weight of the craft is balanced by a hydrodynamic lift. Said hydrodynamic lift is proportional to the square of the speed of the craft. At the same time, also the hydrodynamic resistance is proportional to the square of the speed, so that a high hydrodynamic lift necessary to support a heavy craft necessarily generates a high hydrodynamic resistance. Moreover, also the aerodynamic resistance increases with the square of the speed and thus the power necessary to maintain the craft in motion is proportional to the cube of the speed, and a considerable amount of this power is required just to overcome the aerodynamic resistance.

SUMMARY AND OBJECTS OF THE INVENTION

An object of the present invention is a hydrohull which is able to reduce the hydrodynamic resistance almost up to 0 when it moves at high speeds. It is a further object of the invention to reduce the aerodynamic resistance when the hydrohull moves at high speeds.

These and other objects, which will become clear on reading the text which follows, are achieved with a high-speed hydrohull comprising a portion having, in a longitudinal section, an airfoil profile with a low coefficient of aerodynamic resistance, having a convex upper surface in order to create, during the movement of the hydrohull, such lift as to raise the hydrohull over the surface of the water.

The shaping as an airfoil profile enables two objects to be simultaneously achieved: on the one hand the reduction in the resistance to advance even at high speeds, that is with the hull in practice completely out of the water; and on the other hand the same shaping of the hydrohull helps to raise said hydrohull, quickly carrying it up over the water, thereby in practice cancelling the hydrodynamic resistance.

In practice the lower surface of said portion with the airfoil profile can be substantially plane, but different profiles are not excluded, whether concave or convex depending on the speed and aerodynamic characteristics which it is desired to obtain.

In a particularly advantageous embodiment, hulls or floats extend along the side walls of the hydrohull, projecting below the lower surface of said portion with the airfoil profile, and these are immersed in the water when the hydrohull is at rest or is moving at low speed, so as to provide the hydrostatic thrust required for floating. In addition, said hulls eliminate the tendency for the pressures to equalize over the upper and lower surfaces respectively of the portion with the airfoil profile, thereby avoiding the formation of induced resistances.

Two ailerons may be associated with the hull, said ailerons being controllable independently of each other to ensure the horizontal and vertical stability of the hydrohull. At least one vertical stabilizer may also be provided extending above the hydrohull and equipped with a directional rudder. Advantageously, two vertical stabilizers may be provided arranged symmetrically with respect to the middle of the hydrohull in the vicinity of the stern.

The hydrohull may be equipped with a first propulsion means, for example a submerged screw, which is activated when the hydrohull is immersed, and an auxiliary propulsion means for propulsion when the hydrohull is raised above the water.

BRIEF DESCRIPTION OF THE DRAWINGS

The invention will be better understood by following the description and the attached drawing, which shows a practical nonlimiting embodiment of said invention. In the drawing:

FIG. 3 shows a plan view from III—III of FIG. 2;

FIGS. 4, 5 and 6 show a modified embodiment of the invention;

FIGS. 7, 8, and 9 are side views of the hydrohull according to FIG. 5 in each of three positions determined by each of three respectively different speeds and angles of the hydrohull;

FIG. 10 is a list of tabulated data showing values of lift and apparent weight with respect to speed of the hydrohull with the cord making a 5° angle with the surface of the water;

FIG. 11 is a table similar to FIG. 10 with the cord of the wing shaped member making a 10° angle with the surface of the water; and FIG. 12 is a table similar to FIG. 10 showing values for lift and apparent weight with the cord of the wing shaped member at 0° to the surface of the water.

DETAILED DESCRIPTION OF THE INVENTION

Figure 1:
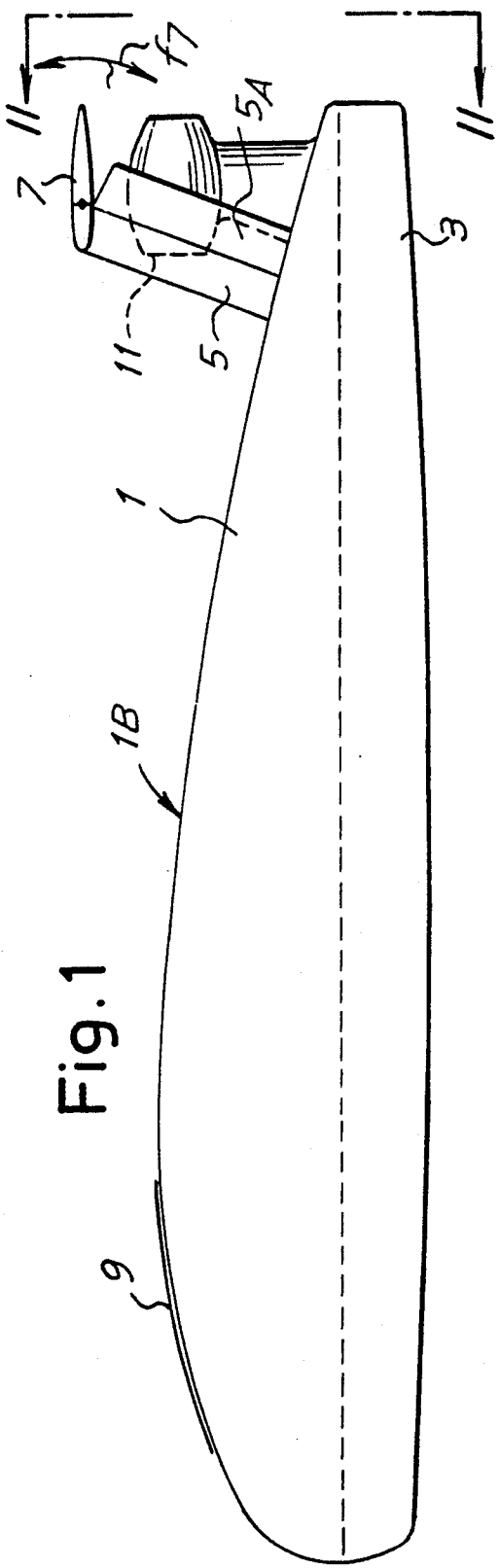
FIGS. 1 and 2 show a diagrammatic side view and a rear view from II—II of a hydrohull according to the invention.

As shown in particular by FIG. 1; the craft presents an upper portion 1 with a substantially plane-convex airfoil profile, which is intended to remain constantly in the air and offers very low aerodynamic resistance. The fluid threads of air which strike the bows of the craft flow over the lower plane surface 1A and over the upper convex surface 1B of the portion 1, producing lift due to depression, by the Bernoulli principle, with the center of pressure at about a third of the chord of the profile of said portion 1.

Beneath the portion 1 of the hydrohull two further portions 3 are provided, extending longitudinally along the hydrohull as downward extensions of the craft's sides, which portions are intended to remain immersed in the water when the craft is at rest or is moving at low speed, thus providing the hydrostatic thrust required for floating. The two portions or floats 3 also perform a further important aerodynamic function. In fact, when the craft is moving at high speed and planing over the water, because of the shape of the surfaces 1A and 1B the air pressure over the lower surface 1A is greater than the pressure over the upper surface 1B, so that there is a tendency toward the formation of a current of fluid (air) from the lower surface to the upper surface with consequent formation of turbulence and induced resistance. The presence of the floats 3 prevents the formation of the said turbulence and therefore reduces the induced resistance.

At the stern of the craft two vertical stabilizers 5 are provided with synchronized directional rudders 5A, able to control the direction of the craft when it is lifted out of the water and the water rudder is no longer able to steer said craft.

Besides the vertical stabilizers 5, at the stern of the craft two independently movable ailerons 7 are also arranged, which project from the hull, in such a way as to avoid staying in the lee, from the top of the vertical stabilizer. Said ailerons have an airfoil profile and can be tilted independently of each other as shown by the double arrow f7 (FIG. 1), in such a way as to vary the resultant and the point of application of the resultant of the pressure forces on each aileron. The forces which develop on the ailerons 7 may be lifting or downthrusting, that is directed upwards or downwards, according to the tilt which they assume. In this way it is possible to ensure the vertical equilibrium of the craft when out of the water. In fact, said equilibrium is given by the action of the pressure force on the portion 1, by the weight of the craft and by the pressure forces (lifting or downthrusting) on the two ailerons 7. By modifying the trim of the ailerons it is possible to shift the center of pressure to coincide with the barycenter, cancelling out any capsizing couple which may develop when the craft changes trim due to its own increase in speed. Also, since the ailerons can be tilted independently of each other, they can also be used to ensure the horizontal stability of the craft when out of the water by creating the lifting or downthrusting forces on the ailerons with variable moduli, independently for the two ailerons.

As clearly shown in FIG. 1, the piloting position is completely internal to the deck line, and the deck thus presents no protuberance which could generate resistance and turbulence. Visibility is ensured by a large transparent canopy 9.

The propulsion of the craft is provided in the first place by an immersed screw (not shown) which provides the thrust when the hull is immersed. Conversely, when the hull is out of the water auxiliary propulsion means may become necessary, particularly when the hull is designed to rise noticeably out of the water and in such a way that the screw is no longer immersed. In the example of the drawing a small jet engine 11 is provided at the stern. It is however possible to use any other suitable propulsion means.

Figure 2:
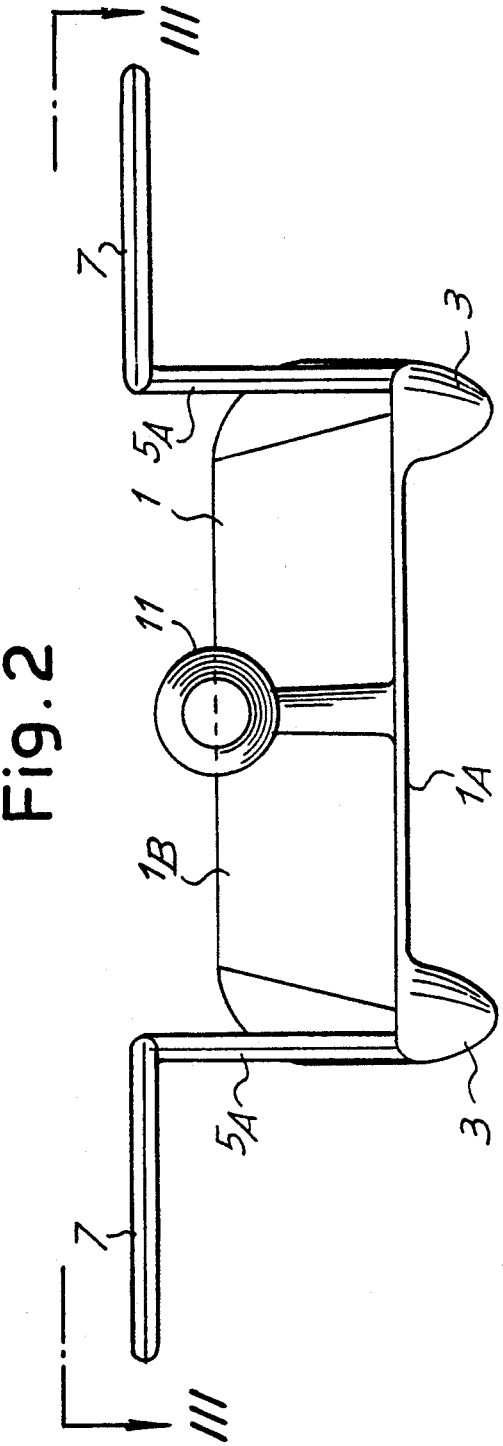

FIGS. 4, 5 and 6 show a side view, a rear view and a plan view respectively of a modified embodiment of the hydrohull of the invention. Equal or corresponding parts are designated with the same reference numerals as in FIGS. 1 to 3. In this embodiment, the portions or hulls 3 are step-shaped, so that they are thicker toward the prow and thinner toward the stern. An optimal position of the center of gravity is thus obtained. In fact, the center of gravity is placed approximately at one third of the length of the hydrohull from the prow and its position with respect to the position of the center of pressure is such that the hydrohull is self-stabilizing.

Moreover, the ailerons 7 are combined to a fixed airfoil portion 7B which extends between the two stabilizers 5.

FIGS. 4 and 5 also show the possible position of two screws 8. FIG. 4 also shows in broken line the profile of the upper portion 1 which in this case has a lower concave surface.

FIGS. 7, 8 and 9 show various attitudes of the boat according to the present invention. FIG. 7 shows the boat at zero speed. The angle between the chord C of the airfoil profile and the horizontal is 5°.

Starting from this attitude, the boat is made to accelerate. The step-shaped profile of the floating elements allow a lifting of the prow, so that the angle $\alpha$ is increased from 5° (FIG. A) to 10°–15° (FIG. B). This causes an increase of the aerodynamic lift on the boat and thus a reduction of the apparent weight of the boat itself. The lift causes a reduction of the volume of the boat which is immersed in the water and thus a reduction of the water resistance. This causes, in turn, an increase of the speed. Since the lift is proportional to the square of the speed, the speed increase causes also a further increase in the lift, a further reduction in the water resistance, a further increase in the speed, and so on. At the end of this process, the boat reaches a condition where the apparent weight (weight-lift) thereof is zero. A further increase of speed would cause a take-off of the boat.

Tables A, B, and C explain the above process by means of numerical data obtained from calculation on a model boat weighing 9.5 kg.

Table A refers to a $Cp=0.238$, and to an angle $\alpha=5°$. It can be seen that in order to reach an apparent weight equal to zero, the boat should achieve a speed between 115/km/h and 120 km/h (32 m/s and 34 m/s). If the angle $\alpha$ is increased to 10°, as it happens if the boat is step-shaped, the zero weight is achieved at a lower speed (see table B, and FIG. B): between 93 and 100 km/h.

This means that the minimum resistance is achieved earlier if the angle $\alpha$ can be increased.

If the boat is intended not to loose the contact with the water (i.e. if it must not actually take off), the maximum speed which can be maintained would be about 100 km/h with $\alpha=10°$.

Since the hulls are step-shaped, however, once the boat has reached (in the attitude at FIG. 8) the maximum speed above which it would take off, the attitude of the boat can be changed to that of FIG. 9, rotating about a horizontal and transversal axis. This reduces the angle $\alpha$ to 0°. Table C shows that under these conditions the boat can remain in contact with the water even if the speed increases up to 180 km/h. In fact, also at this speed its apparent weight is greater than zero, but much lower than the actual weight, so that the water resistance is kept at a minimum.

The passage from attitude shown in FIG. 7 to attitude shown in FIG. 8 and then gradually to attitude shown in FIG. 9 is possible only as far as a step-shaped profile of the floating hulls is provided.

I claim:

1. A high-speed hydrohull, comprising:
   a center portion having, in a longitudinal section, means defining an airfoil profile with a low coefficient of aerodynamic resistance, said airfoil profile including a convex upper surface for creating lift during movement of the hydrohull for raising the hydrohull with respect to the surface of water;
   first and second water engaging elements connected to said hydrohull and extending downwardly from a lower surface of said center portion, said water engaging elements being spaced apart a distance substantially corresponding to a width of said hydrohull, each of said water engaging elements being immersed in water during non-movement and slow speed movement of said hydrohull and planing on the water upon movement of said hydrohull at a speed generating said lift, each of said water engaging elements being step shaped defining a thicker portion at a prow of the hydrohull and a thinner portion at a stern of the hydrohull and a middle portion of intermediate thickness, each of said thicker portion, said intermediate portion, and said thinner portion being separated by a vertical discontinuity;
   vertical stabilizer means including a vertical stabilizer extending upwardly from a stern portion of said center portion, said vertical stabilizer supporting a directional rudder, said directional rudder being pivotable, along a substantially vertical axis with respect to said vertical stabilizer; and
   aileron means connected to said vertical stabilizer means, extending outwardly in a direction away from said center portion and beyond said engaging elements, said ailerons means including independently adjustable surfaces pivotable with respect to a substantially horizontal aileron axis; and
   said aileron means being adjustable for pivoting the hydrohull about a submerged axis transverse to the hydrohull, said axis passing through said thicker portion of said water engaging elements defined by said step-shaped water engaging elements said airfoil profile and said aileron means cooperating to lift the hydrohull onto said thicker portion of said water engaging elements.

2. The hydrohull as claimed in claim 1, in which the lower surface (1A) of said center portion (1) with the airfoil profile is substantially plane.

3. The hydrohull as claimed in claim 1, in which the lower surface (1A) of said center portion (1) with the airfoil profile is substantially concave.

4. The hydrohull as claimed in claim 1, wherein said water engaging elements comprise hulls or floats (3) projecting below the lower surface (1A) of said portion (1) with the airfoil profile.

5. The hydrohull as claimed in claim 1, wherein said aileron means includes two ailerons (7) controllable independently of each other to ensure the horizontal and vertical stability of the hydrohull.

6. The hydrohull as claimed in claim 5, wherein the ailerons (7) extend transversely across the hydrohull over its whole width and said aileron having a cross-section with a fixed airfoil profile (7B).

7. The hydrohull as claimed in claim 1, wherein said vertical stabilizer means comprises two vertical stabilizers, arranged symmetrically with respect to the middle of the hydrohull center portion in the vicinity of the stern.

8. The hydrohull as claimed in claim 1, wherein an auxiliary propulsion means is associated for propulsion when the hydrohull is lifted above the water.

9. The hydrohull as claimed in claim 1, with which a single propulsion means, not in contact with the water, is provided.

10. The hydrohull according to claim 1, wherein said lower surface of said center portion, including an airfoil profile, is substantially convex.

11. A high-speed hydrohull, comprising:
    a center portion having, in a longitudinal section, means defining an airfoil profile with a low coefficient of aerodynamic resistance, said airfoil profile including a convex upper surface for creating lift during movement of the hydrohull for raising the hydrohull with respect to the surface of water, said airfoil profile forming an angle with the surface of the water;
    first and second water engaging elements connected to said hydrohull and extending downwardly from a lower surface of said central portion, said water engaging elements being spaced apart a distance substantially corresponding to a width of said hydrohull, each of said water engaging elements providing an upward hydrostatic thrust to the hydrohull and being immersed in the water during non-movement;
    a first pivot means for pivoting the hydrohull about a first axis which is transverse to the hydrohull including said water engaging elements having step-shaped sections defining a thicker portion at a prow of the hydrohull and defining a thinner portion at a stern of the hydrohull and an intermediate portion therebetween, each of said thicker portion, said intermediate portion, and said thinner portion being separated by a vertical discontinuity said first axis passing through said thinner portion of the water engaging elements; and said first pivot means including said lift cooperating with said hydrostatic thrust provided by said stepped shaped sections to raise said hydrohull out of the water to pivot the hydrohull about said first axis thereby increasing the angle said airfoil profile makes with the water,
    vertical stabilizer means including a vertical stabilizer extending upwardly from a stern portion of said center portion, said vertical stabilizer supporting a directional rudder, said directional rudder being pivotable, along a substantially vertical axis with respect to said vertical stabilizer;
    aileron means connected to said vertical stabilizer means, extending outwardly in a direction away from said center portion said aileron means including independently adjustable surfaces pivotable with respect to a substantially horizontal aileron axis;
    a second axis being transverse to the hydrohull and passing through said thicker portion of the prow and being substantially adjacent to the surface of the water, a second pivot means for pivoting the hydrohull about said second axis, defined by said aileron means raising said thinner step shaped portion and maintaining contact with the water at said second axis; and
    propulsion means including propulsion elements in contact with the water.

* * * * *